US010677944B2

(12) United States Patent
Jackson et al.

(10) Patent No.: US 10,677,944 B2
(45) Date of Patent: Jun. 9, 2020

(54) EARTHQUAKE AND DISPLACEMENT EARLY WARNING SYSTEM

(71) Applicant: Trimble Navigation Limited, Sunnyvale, CA (US)

(72) Inventors: Michael E. Jackson, Longmont, CO (US); Paul Passmore, Dallas, TX (US); Hans-Gerd Dünck-Kerst, Höfer (DK)

(73) Assignee: Trimble Inc., Sunnyvale, CA (US)

( * ) Notice: Subject to any disclaimer, the term of this patent is extended or adjusted under 35 U.S.C. 154(b) by 991 days.

(21) Appl. No.: 14/466,975

(22) Filed: Aug. 23, 2014

(65) Prior Publication Data
US 2016/0054460 A1  Feb. 25, 2016

(51) Int. Cl.
| | |
|---|---|
| *G01V 1/00* | (2006.01) |
| *G08B 21/10* | (2006.01) |
| *G01S 19/17* | (2010.01) |
| *G01S 19/16* | (2010.01) |

(52) U.S. Cl.
CPC ............. *G01V 1/008* (2013.01); *G08B 21/10* (2013.01); *G01S 19/16* (2013.01); *G01S 19/17* (2013.01); *G01V 2210/1232* (2013.01)

(58) Field of Classification Search
CPC ........ G01V 1/008; G08B 21/10; G01S 19/17; G01S 19/47
See application file for complete search history.

(56) References Cited

U.S. PATENT DOCUMENTS

| | | | |
|---|---|---|---|
| 6,408,245 B1 * | 6/2002 | An | G01C 21/165 340/450 |
| 7,425,902 B2 * | 9/2008 | Fedora | G01V 1/008 340/690 |
| 7,498,979 B2 | 3/2009 | Liu et al. | |

(Continued)

FOREIGN PATENT DOCUMENTS

| | | |
|---|---|---|
| CN | 102608625 A | 7/2012 |
| CN | 103760594 A | 4/2014 |

(Continued)

OTHER PUBLICATIONS

Smythe et al. "Multi-rate Kalman Filtering for the Data Fusion of Displacement and Acceleration Response Measurements in Dynamic System Monitoring"). Elsevier Mechanical Systems and Signal Processing 21 (2007) p. 706-723.*

(Continued)

*Primary Examiner* — Gregory C. Issing
(74) *Attorney, Agent, or Firm* — Adsero IP (57) ABSTRACT

Novel solutions, which can include devices, systems, methods, than can measure earthquakes and other displacement events. Some solutions feature the integration of real-time, high-rate global navigation satellite system ("GNSS") displacement information with acceleration and/or velocity data within a single device to create very high-rate displacement records. The mating of these two instruments allows the creation of a new, very high-rate displacement measurement device that has the full-scale displacement characteristics of GNSS and high-precision dynamic motions of (Continued)

seismic technologies. Such a device can be used for earthquake early warning studies and other mission critical applications, such as volcano monitoring, building, bridge and dam monitoring systems.

23 Claims, 5 Drawing Sheets

(56) References Cited

U.S. PATENT DOCUMENTS

| | | | |
|---|---|---|---|
| 8,587,475 B2 | 11/2013 | Leandro | |
| 2004/0246111 A1 | 12/2004 | Oyagi et al. | |
| 2009/0058723 A1* | 3/2009 | Mao | G01S 19/47 342/357.3 |
| 2009/0115656 A1* | 5/2009 | Raman | G01S 19/47 342/357.24 |

FOREIGN PATENT DOCUMENTS

| | | | | |
|---|---|---|---|---|
| WO | WO 2011157686 A1 * | 12/2011 | | G01V 1/008 |
| WO | WO 2016/032897 A1 | 3/2016 | | |

OTHER PUBLICATIONS

Colombelli, Simona et al, "Test of a Threshold-Based Earthquake Early-Warning Method Using Japanese Data." Bulletin of the Seismological Society of America, vol. 102, No. 3, pp. 1266-1275, Jun. 2012.*

Hammond, W.C. et al, "The Scientific Value of High-Rate, Low-Latency GPS Data." Transactions of the American Geophysical Union Eos Trans. Am. Geophys. Union, 92(15), 1-5, 2011.*

Bock, Y, Melgar D, Crowell BW. 2011. Real-Time Strong-Motion Broadband Displacements from Collocated GPS and Accelerometers. Bulletin of the Seismological Society of America. vol. 101, No. 6. pp. 2904-2925. Dec. 2011.*

Ding, Weidong. "Optimal Integration of GPS with Inertial Sensors: Modelling and Implementation." Thesis, Univ. of South Wales, Mar. 2008, pp. 1-161.*

Gade, Kenneth. "Introduction to Inertial Navigation and Kalman Filtering (INS Tutorial)." Introduction to Inertial Navigation and Kalman Filtering. Tutorial for IAIN World Congress, Stockolm, Sweden, Oct. 2009. pp. 1-60.*

International Search Report and Written Opinion prepared by the European Patent Office ans International Searching Authority for PCT International Patent Application No. PCT/US15/46306, dated Dec. 2, 2015; 14 pages.

Li, Xingxing et al. (Nov. 24, 2013); "Application of Collocated GPS and Seismic Sensors to Earthquake Monitoring and Early Warning"; Sensors 13(11): 14261-14276.

Bock, et al. (2011) "Real-Time Strong-Motion Broadband Displacements from Collocated GPS and Accelerometers," Seismological Society of America 101(6):2904-2925; 22 pages.

Crowell, et al. (2009) "Demonstration of Earthquake Early Warning Using Total Displacement Waveforms from Real-time GPS Networks," Scripps Institution of Oceanography: Seismological Research Letters 80(5):772-782; 11 pages.

Geng, et al. (2013) "A new seismogeodetic approach applied to GPS and accelerometer observations of the 2012 Brawley seismic swarm: Implications for earthquake early warning," AGU and the Geochemical Society 14(7):2124-2142; 19 pages.

Kanamori (2004) "Real-Time Seismology and Earthquake Damage Mitigation," Annu Rev Earth Planet. Sci. 2005(33):195-214; 25 pages.

Passmore, et al. (2013) "Acquisition Hardware for Rapid Event Notification System," REF TEK—A Division of Trimble; 1 page.

International Preliminary Report on Patentability (IPRP) prepared by the International Bureau for PCT International Patent Application No. PCT/US15/46306, dated Feb. 28, 2017; 9 pages.

* cited by examiner

EARTHQUAKE AND DISPLACEMENT EARLY WARNING SYSTEM

COPYRIGHT STATEMENT

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD

The present disclosure relates, in general, to movement detection and more particularly, to technology for detecting displacement, including without limitation, displacement resulting from earthquakes.

BACKGROUND

Historically, a number of sensors have been used to detect earthquakes or other large-scale displacement (e.g., movement of a structure, such as a bridge support). Seismometers can be used to measure velocity at a very high precision, and this velocity can be integrated to determine an amount of movement (displacement) over a given time frame. Similarly, an accelerometer can be used to determine acceleration with a high degree of precision, and this acceleration data can be double integrated to determine a displacement over a given time frame. More recently, global navigation satellite system ("GNSS") technology has evolved to the point where it can be used to measure displacement of a known point.

Each of these technologies has limitations, however. Seismic sensors (e.g., seismometers, accelerometers) tend to experience drift over time; as such, while measurements over a short observation window are highly precise, measurements over longer windows are subject to such drift, creating imprecision and/or inaccuracy. Additionally, such seismic sensors are subject to clipping or saturation when detected dynamics overload sensor capabilities, preventing such sensors from measuring the full displacement in highly dynamic situations. On the other hand, GNSS technology generally cannot provide sufficient resolution to detect displacement with a high degree of precision over a short observation window.

There have been attempts to combine different types of seismic data sets in order to obtain better estimates of displacements and earthquake parameters. Such efforts, however, generally have been limited to collection of different data sets from different measurement devices and correlation of these data sets using post-processing techniques. While certainly useful for the study of earthquake behavior, such techniques necessarily include far too much latency to be of use in earthquake early warning ("EEW") systems.

More specifically, one of the fundamental requirements of EEW systems, critical infrastructure monitoring systems, and other mission critical displacement applications is to quickly detect and process the information from a strong motion event earthquake event, i.e. event detection and location, magnitude estimation, and the peak ground motion estimation at the defined targeted site. Early warning can enable civil protection authorities to provide pre-programmed emergency response actions: Slow down or stop rapid transit trains and high-speed trains; shutoff of gas pipelines and chemical facilities; stop elevators at the nearest floor; send alarms to hospitals, schools and other civil institutions; and the like.

Thus, there is a need for an EEW that can provide more accurate, and faster data to allow more accurate assessment and earlier warning of earthquakes and other structural displacements.

BRIEF SUMMARY

A set of embodiments provides solutions, which can include devices, systems, methods, than can measure earthquakes and other displacement events. Some embodiments feature the integration of real-time, high-rate GNSS displacement information with acceleration and/or velocity data within a single device to create very high-rate displacement records. The mating of these two instruments allows the creation of a new, very high-rate displacement measurement device that has the full-scale displacement characteristics of GNSS and high-precision dynamic motions of seismic technologies. Such a device can be used for earthquake early warning studies and other mission critical applications, such as volcano monitoring, building, bridge and dam monitoring systems, anti-theft systems for large, valuable objects, and the like.

The tools provided by various embodiments include, without limitation, methods, devices, systems, and/or software products. Merely by way of example, a method might comprise one or more procedures, any or all of which are executed by a computer system. Correspondingly, an embodiment might provide a computer system configured with instructions to perform one or more procedures in accordance with methods provided by various other embodiments. Similarly, a computer program might comprise a set of instructions that are executable by a computer system (and/or a processor therein) to perform such operations. In many cases, such software programs are encoded on physical, tangible and/or non-transitory computer readable media (such as, to name but a few examples, optical media, magnetic media, and/or the like).

For example, an EEW system in accordance with one set of embodiments might comprise a housing. Disposed within the housing, the EEW system might further comprise a GNSS receiver, one or more seismic sensors (e.g., seismometers, accelerometers, etc.), an input/output interface, a processor, and/or a computer readable medium. In some embodiments, the computer readable medium might have encoded thereon a set of instructions executable by the processor to perform one or more operations in accordance with various embodiments.

Merely by way of example, the set of instructions might include instructions to receive GNSS position data with the GNSS receiver; in an aspect, the GNSS receiver might have a GNSS operating characteristic (which can be, but is not limited to one or more of an operating frequency, resolution, and/or sample rate, to name a few examples) and a GNSS error characteristic (which might be measurement limitations, systemic noise, or the like, to name a few examples). The set of instructions might include instructions to receive GNSS correction data over a network connection or from a GNSS satellite and/or instructions to correct the GNSS position data using the GNSS correction data. The set of instructions might further include instructions to calculate a GNSS displacement value from the GNSS position data gathered over a specified sample period.

In some cases, the set of instructions includes instructions to observe seismic data with the one or more seismic sensors, the one or more seismic sensors each having a seismic operating characteristic (which can be, but is not limited to one or more of an operating frequency, resolution, and/or sample rate, to name a few examples) and a seismic error characteristic (which might be systemic drift, clipping or saturation thresholds, or the like, to name a few examples), and/or instructions to integrate the seismic data to calculate a seismic sensor displacement value over a specified sample period.

In a particular embodiment, the set of instructions includes instructions to combine the GNSS displacement value with the seismic sensor displacement value in a Kalman filter, based at least in part on the GNSS operating characteristic and error characteristic and the seismic operating characteristic and error characteristic. In some cases, combining the GNSS displacement and the seismic sensor displacement value comprises performing at least a forward filtering operation with the Kalman filter. The set of instructions, then, can include instructions to determine, in real time, an estimated displacement value and an estimated velocity value from the combined GNSS and seismic sensor displacement values, and/or instructions to transmit the estimated displacement value and the estimated velocity value using the input/output interface.

In some embodiments, the set of instructions can include instructions to calculate, in real time, a predominant period of a measured displacement and/or instructions to calculate, in real time, a peak displacement during the predominant period. There might be further instructions to determine an intensity level of an earthquake based at least in part on one or more of the predominant period and the peak displacement, and/or instructions to transmit an earthquake warning indicating the determined intensity level using the input/output interface.

In accordance with another set of embodiments, a displacement measurement device might comprise a housing, a GNSS receiver disposed within the housing, one or more seismic sensors disposed within the housing, an input/output interface, a processor disposed within the housing, and/or a computer readable medium disposed within the housing. In one aspect, the computer readable medium can have encoded thereon a set of instructions executable by the processor to perform one or more operations in accordance with various embodiments.

In a set of embodiments, the instructions might include instructions to receive GNSS position data with the GNSS receiver, instructions to observe seismic data with the one or more seismic sensors, instructions to integrate the seismic data to calculate a seismic sensor displacement value over a specified sample period, and/or instructions to calculate a GNSS displacement value from the GNSS position data gathered over the specified sample period. The set of instructions might further include instructions to combine the GNSS displacement value with the seismic sensor displacement value in a Kalman filter. The set of instructions, then, might further include instructions to determine, in real time, at least one of an estimated displacement value or an estimated velocity value from the combined GNSS and seismic sensor displacement values, and/or instructions to transmit the at least one of the estimated displacement value or the estimated velocity value using the input/output interface Yet another set of embodiments provides methods. An exemplary method might comprise placing, at a measurement location, a displacement measurement device, such as one of the devices described above. The method can further include receiving, with the GNSS receiver, GNSS position data, the GNSS receiver having a GNSS operating characteristic and a GNSS error characteristic; observing, with the one or more seismic sensors, seismic data, the one or more seismic sensors each having a seismic operating characteristic and a seismic error characteristic; integrating the seismic data to calculate a seismic sensor displacement value over a specified sample period; calculating a GNSS displacement value from the GNSS position data gathered over the specified sample period; combining the GNSS displacement value with the seismic sensor displacement value in a Kalman filter, based at least in part on the GNSS operating characteristic and error characteristic and the seismic operating characteristic and error characteristic; determining, in real time, at least one of an estimated displacement value or an estimated velocity value from the combined GNSS and seismic sensor displacement value; and/or transmitting the at least one of the estimated displacement value or the estimated velocity value using the input/output interface.

A further set of embodiments might provide apparatus, including without limitation a non-transitory computer readable medium having encoded thereon a set of instructions executable by a computer, including without limitation instructions such as those described above and/or instructions to perform operations in accordance with methods provided by various embodiments.

BRIEF DESCRIPTION OF THE DRAWINGS

A further understanding of the nature and advantages of particular embodiments may be realized by reference to the remaining portions of the specification and the drawings, in which like reference numerals are used to refer to similar components. In some instances, a sub-label is associated with a reference numeral to denote one of multiple similar components. When reference is made to a reference numeral without specification to an existing sub-label, it is intended to refer to all such multiple similar components.

DETAILED DESCRIPTION OF CERTAIN EMBODIMENTS

While various aspects and features of certain embodiments have been summarized above, the following detailed description illustrates a few exemplary embodiments in further detail to enable one of skill in the art to practice such embodiments. The described examples are provided for illustrative purposes and are not intended to limit the scope of the invention.

In the following description, for the purposes of explanation, numerous specific details are set forth in order to provide a thorough understanding of the described embodiments. It will be apparent to one skilled in the art, however, that other embodiments of the present may be practiced without some of these specific details. In other instances, certain structures and devices are shown in block diagram form. Several embodiments are described herein, and while various features are ascribed to different embodiments, it should be appreciated that the features described with respect to one embodiment may be incorporated with other embodiments as well. By the same token, however, no single feature or features of any described embodiment should be considered essential to every embodiment of the invention, as other embodiments of the invention may omit such features.

Unless otherwise indicated, all numbers used herein to express quantities, dimensions, and so forth used should be understood as being modified in all instances by the term "about." In this application, the use of the singular includes the plural unless specifically stated otherwise, and use of the terms "and" and "or" means "and/or" unless otherwise indicated. Moreover, the use of the term "including," as well as other forms, such as "includes" and "included," should be considered non-exclusive. Also, terms such as "element" or "component" encompass both elements and components comprising one unit and elements and components that comprise more than one unit, unless specifically stated otherwise.

Certain embodiments can provide a real-time, in-the-field EEW system and/or displacement measurement device. Such devices and systems can feature the integration of real-time, high-rate GNSS displacement information with acceleration and/or velocity data within a single device to create very high-rate (e.g., 200 Hz or greater) displacement records. As used herein, the term, "displacement," means movement from a known point during a sample period, and it can be considered the integral of a velocity vector measured by a seismometer over a sample period, the double integral of an acceleration vector measured by an accelerometer over a sample period, or an amount of movement measured by a GNSS sensor over a sample period, to name a few examples.

The mating of two (or more) displacement sensors (e.g., a GNSS sensor and an accelerometer and/or seismometer) allows the creation of a new, very high-rate displacement measurement device that has the full-scale displacement characteristics of GNSS and high-precision dynamic motions of seismic technologies. Such a device can be used for earthquake early warning studies and other mission critical applications, such as volcano monitoring, building, bridge and dam monitoring systems, anti-theft systems for large, valuable objects, and the like.

More specifically, some embodiments can take advantage of the relative strengths, and minimize the relative weaknesses, of different sensor technologies within a single device. This can allow for real-time measurement and warnings, which is impractical or impossible with post-processing-based solutions. (As used herein, the term "real-time" means with a latency of less than one second, unless other latencies are specifically described.) For instance, a typically corrected GNSS solution might have a resolution of 1 cm, with an operating frequency from infinite (effectively constant, or a period of zero) to about 2-3 Hz at a measurement distance of 1 km to effectively infinite frequency (constant, or a period of zero). Conversely, an accelerometer might have a resolution of 300 micrometers and a frequency of about 0.016 to 80 Hz.

As such, a seismic sensor (e.g., an accelerometer or seismometer) is very precise over short time periods, but it will experience drift over longer measurement periods. A corrected GNSS measurement is less precise in short measurement periods, but it is highly stable over long periods and can serve to discipline the measurements obtained by a seismic sensor (e.g., by locking the coarse position of the seismic sensor to prevent drift from affecting displacement measurements). In addition, seismic sensors are subject to clipping or saturation when the sensor is overloaded with high displacement, velocity, and/or acceleration conditions. The GNSS measurement, on the other hand, has virtually unlimited capacity to measure displacement, so that measurement can control when seismic sensors overload.

In an aspect, certain embodiments use sophisticated, real-time processing routines to combine the measurements from two or more sensors. For example, an embodiment might use a Kalman filter to estimate displacement and/or velocity values based on noisy inputs from multiple sensors (e.g., a GNSS receiver, an accelerometer, and/or a seismic sensor). In an aspect, the Kalman filter is generated in such a way to account for the relative strengths of each sensor, as well as the error characteristics of each sensor, to predict a system state from the combination of the sensor inputs. From that prediction of system state, the filter can be used to provide an improved estimate of the measured displacement and/or velocity, optimized based on the measurement conditions and the sensor inputs. In some embodiments, because the sensors and the processing system employing the Kalman filter are all within the same device, the latency between data acquisition and output of the estimated values can be minimized (in some cases to well less than a second, such as to within about 200 ms or even to within about 30 ms), allowing for much earlier detection and notification of an earthquake (or other displacement event).

Figure 1:
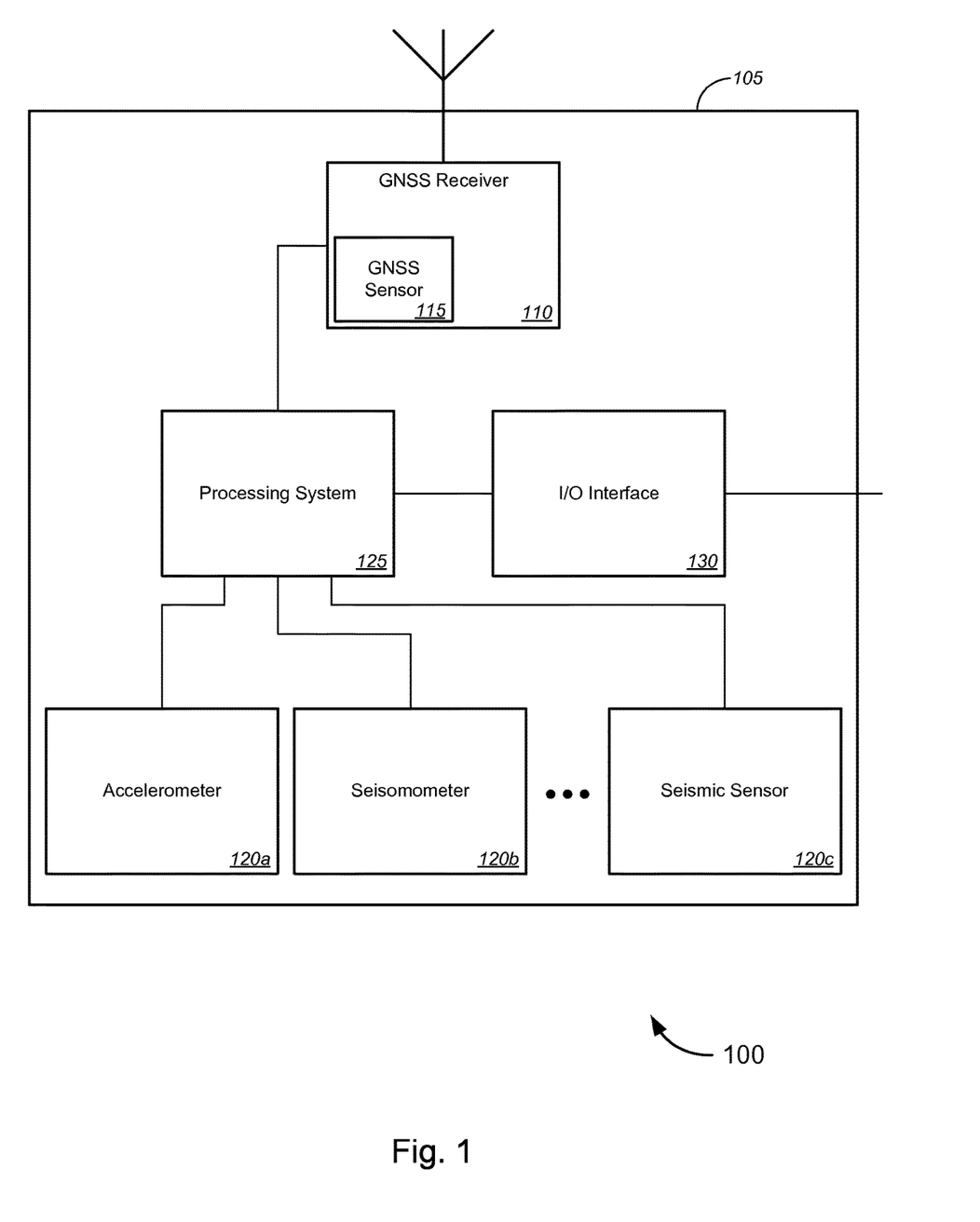
FIG. 1 is a block diagram illustrating a displacement measurement device, in accordance with various embodiments.

FIG. 1 illustrates a displacement measurement device 100, which can also serve as part of an EEW system. The measurement device 100 includes a housing 105, which contains other device components and can be made of any suitable combination of materials, such as a variety of plastics, polyethylenes, metals, and/or the like. In some cases, the housing 105 might include one or more attachment devices (not shown on FIG. 1) to allow the device 100 to be fixedly attached in a measurement location (which might be on a structure, to the ground surface in a specified location, etc.).

Although embodiments can vary, the device 100 illustrated by FIG. 1 includes a GNSS receiver 110 (which can include a GNSS sensor 115). In some respects, the GNSS receiver 110 is capable of real-time precise point positioning ("PPP") techniques based on GNSS corrections received via satellite and/or over a network connection. Several such receivers that employ such technology are available from Trimble Navigation Ltd. under the Real Time eXtended™ (RTX™) brand and/or are described in U.S. Pat. Nos. 7,498,979 and 8,547,472, both of which are incorporated herein by reference, but PPP techniques are not limited to these solutions. In an aspect, the GNSS receiver 110 might have known operating characteristics, such as an operating frequency (which might range from infinite (i.e., a period of zero) to about 2-3 Hz depending on resolution, and a sample rate of 10 samples per second, all of which be adjustable based on configuration settings of the GNSS receiver 110. The GNSS receiver 110 also might have known error characteristics. For example, an error characteristic of the GNSS receiver 110 might be that the receiver 110 cannot resolve changes in position (displacement) less than 200 mm, or that the data obtained by the GNSS receiver 110 has certain noise characteristics.

In some embodiments, the device 100 includes one or more seismic sensors, which can include one or more accelerometers 120*a*, one or more seismometers 120*b*, and or other seismic sensor(s) 120*c*. Each of the seismic sensors 120 can be capable of measuring (or, more properly, in many cases, deriving) displacement, in different ways, depending on the nature of the sensor. For instance, as noted above, an accelerometer 120*a* might measure an acceleration vector, which can be double integrated over an observation period to derive a measured displacement; similarly, a seismometer 120*b* might measure a velocity vector, which can be integrated over the observation period to derive a measured displacement. Other types of seismic sensors 120*c* (which can be additional accelerometers, seismometers, or other sensors) can similarly be used to derive a displacement value over an observation period. Each of the seismic sensors 120 might have known operating characteristics, such as an operating frequency (e.g., from about 0.016 Hz to about 80 Hz) and a sample rate of between about 100 and about 500 samples per second, as well as known error characteristics (e.g., saturation or clipping points at which velocity or acceleration overloads the sensor's capabilities, other known noise characteristics, etc.).

The device 100 can also include a processing system 125, which can comprise one or more processors, computer-readable storage media (which can store instructions for the processor(s), measured data, and/or the like), and any other components, including without limitation those described below with regard to FIG. 4. In some cases, the processing system (or components thereof, such as a processor) can be programmed to perform operations in accordance with methods provided by other embodiments, such as the methods described below with regard to FIGS. 2 and 3. The device 100 can also include an input/output ("I/O") interface 130, which can include any hardware or software necessary or appropriate to allow the device 100 to communicate with other devices, including without limitation communication over a network, such as the Internet or a private network. Merely by way of example, the I/O interface 130 can include components described below with respect to the communications subsystem 430 of FIG. 4.

In some embodiments, all of the components 110-130 are disposed within the housing 105 of the device 100, although this is not required in all cases (and certain components, or portions thereof, such as an antenna for a GNSS receiver 110, an antenna or Ethernet port of an I/O interface 130, etc., can extend beyond the housing 105 of the device 100. Further, it should be noted that, while various functionality is ascribed to certain components of the device 100, the functionality can be arranged differently in other embodiments, and/or some or all of the components can be combined. For example, the processing system 125 might include the I/O interface 130, one or more of the seismic sensors 120, and/or the GNSS receiver 110. For example, the processing system 125 might be designed as an application-specific integrated circuit (ASIC) or system-on-a-chip ("SOC") that includes an I/O interface and/or one or more sensors on a circuit board.

Figure 2:
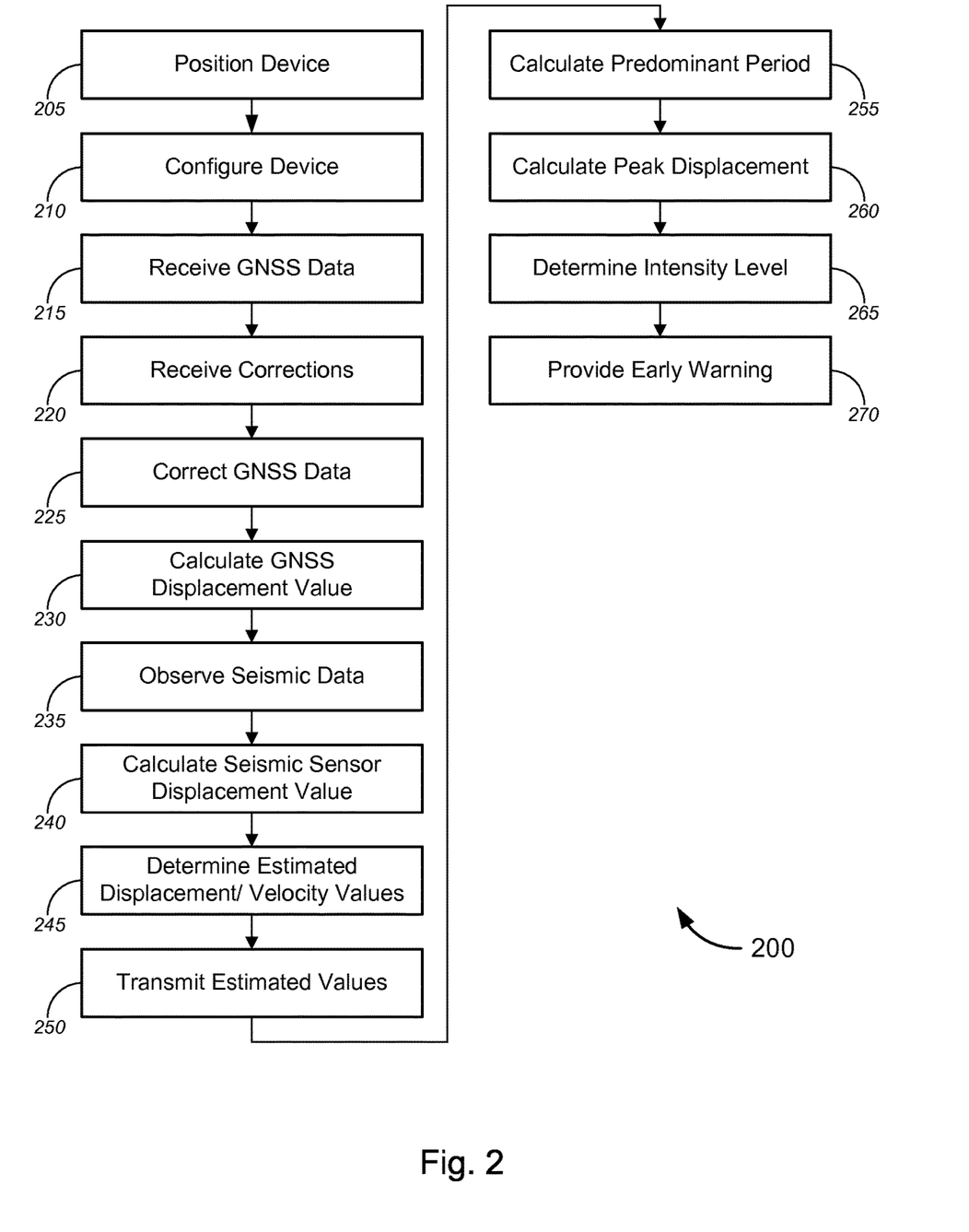
FIG. 2 is a process flow diagram illustrating a method of measuring displacement and/or providing displacement warnings, in accordance with various embodiments.
Figure 3:
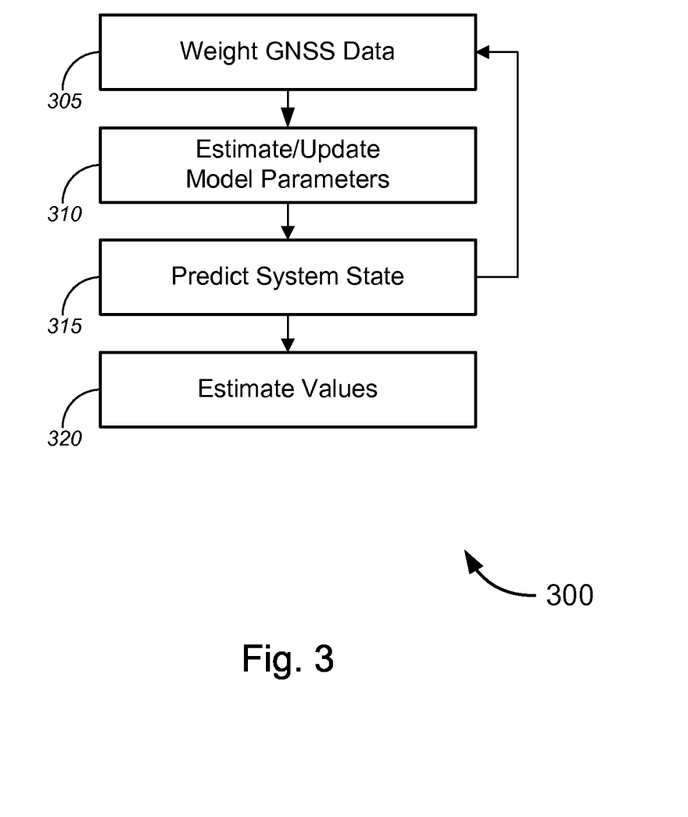
FIG. 3 is a process flow diagram illustrating a method combining measurements from multiple displacement sensors, in accordance with various embodiments.

FIGS. 2 and 3 illustrate various methods that can be used to measure displacement and/or provide warnings of earthquakes and other displacement events While the methods of FIGS. 2 and 3 are illustrated, for ease of description, as different methods, it should be appreciated that the various techniques and procedures of these methods can be combined in any suitable fashion, and that, in some embodiments, the methods depicted by FIGS. 2 and 3 can be considered interoperable and/or as portions of a single method. Similarly, while the techniques and procedures are depicted and/or described in a certain order for purposes of illustration, it should be appreciated that certain procedures may be reordered and/or omitted within the scope of various embodiments. Moreover, while the methods illustrated by FIGS. 2 and 3 can be implemented by (and, in some cases, are described below with respect to) the device 100 of FIG. 1 (or components thereof), these methods may also be implemented using any suitable hardware implementation. Similarly, while the device 100 of FIG. 1 (and/or components thereof) can operate according to the methods illustrated by FIGS. 2 and 3 (e.g., by executing instructions embodied on a computer readable medium), the system 100 can also operate according to other modes of operation and/or perform other suitable procedures.

Turning to FIG. 2, an exemplary method 200, as illustrated, can include positioning a displacement measurement device in a measurement location (block 205). Factors to be considered in choosing a measurement location are known to those skilled in the art and are outside the scope of this disclosure. Several different techniques can be used to position a displacement measurement device, ranging from simply placing it on the ground or on a flat surface to fixedly attaching it to a surface using any of a variety of mounting hardware. For example, a device might be fixedly attached to the side of a bridge abutment, buried under a monument on the ground, and/or the like.

At block 210, the method 200 can include configuring the displacement measurement device. In some embodiments, various parameters of the sensors and/or the devices itself can be configured. Merely by way example, sensor-specific settings that can be configured can include sensor sample frequency, resolution, and the like. GNSS communication settings can be configured. General settings, such as the sample period, combination filter options (e.g., whether to use forward filtering, backward filtering, smoothing, etc.), I/O settings (e.g., transmission frequency, destination address, etc.) and other settings can be configured. In some cases, the displacement management device can be configured manually at the device. In other cases, the device might have an interface to allow remote configuration from a server or client through the I/O interface. Such an interface can include an onboard web server, an API for a dedicated application to access, and/or the like.

The method 200 can further comprise receiving, e.g., with a GNSS receiver in the device (or, more specifically, a GNSS sensor), GNSS position data (block 215). General techniques for receiving GNSS data are known in the art and need not be discussed in detail. In some cases, however, the GNSS receiver might be a PPP receiver, and the method 200 might comprise receiving GNSS correction data (block 215). Such data can be received from a satellite by the GNSS receiver, for example over an L-Band or other transmission. Alternatively and/or additionally, such correction data can be received over a network, for example, through an I/O interface of the displacement measurement device such as a cellular radio, Ethernet port, and/or the like, using either standard (e.g., IP) or proprietary protocols. The correction data can include timing corrections and other corrections (as described further in U.S. Pat. Nos. 7,498,979 and 8,547,472, already incorporated by reference) and can be used to enhance the precision of a GNSS solution calculated from the GNSS data.

In such cases, the method 200 might include, at block 225, correcting the GNSS position data with the correction data, for example using various PPP techniques, including without limitation those described in U.S. Pat. Nos. 7,498,979 and 8,547,472, already incorporated by reference. By correcting the GNSS position data, the device can obtain position solutions with sub-decimeter precision, which can allow the GNSS position data to be used in displacement calculations.

Accordingly, the method 200 can include calculating a GNSS displacement value from the GNSS position data gathered over a specified sample period. Merely by way of example, if the GNSS receiver records two different positions during the sample period, the displacement might be calculated as the vector difference (in one, two, or three dimensions) between the second recorded position and the first recorded position).

At block 235, the method 200 can include observing seismic data with one or more seismic sensors (which, as noted above, can be incorporated within the displacement measurement device). Observing seismic data can include, for instance, recording, with a processing system, output from one or more seismic sensors. The method 200, correspondingly, can include calculating one or more seismic sensor displacement value (e.g., one value for each seismic sensor in use), which can be an expression of any displacement registered by the seismic sensor. Merely by way of example, if the seismic sensor is an accelerometer, calculating the seismic sensor displacement value can comprise computing the double integral of the measured acceleration over the sample period. Similarly, if the seismic sensor is a seismometer, calculating the seismic sensor displacement value can comprise integrating the measured velocity over the sample period.

It should be noted at this point that the GNSS data and the seismic data often will be received as continuous wave forms, such that the measurement and calculation procedures can be iterated over successive sample periods from the wave form data. It should also be appreciated that the sample periods can be discretionary, based on the sample rates of the devices, the amount of latency desired in the system, and the precision with which measurements are desired. In some embodiments, a sample period might be about three seconds. In a typical EEW implementation, for example, the device might monitor for an earthquake using s sensitive P-wave detector and calculate a predominate period over the next 3 seconds and the peak displacement during this 3 seconds. Many researchers, government authorities, and other users desire, in addition to the processed results, the raw data, and this data often needs to be aspect of transmit quickly and efficiently (e.g., with a rapid event notification technique, as described further below).

At block 245, the method 200 can comprise determining estimated displacement and/or velocity values from the GNSS displacement value and/or one or more seismic sensor displacement values, depending on the number of seismic sensors used. (An estimated velocity value can be calculated, for example, by dividing the estimated displacement value by the length of the sample period, and/or it can be taken as a direct measurement from a seismometer.) In one aspect, the process for determining the estimated displacement and/or velocity values can be performed in real time, in large part because the inputs and processing are performed within the same device. For example, in some embodiments, these values can be determined with a latency of less than one second from the time of receipt/observation of the GNSS and seismic data (e.g., from the end of the sample period), while in other embodiments the values can be determined with a latency of less than 200 ms or even with a latency of less than 30 ms (after the sample period has ended), depending on the process of combining the data and the power of the onboard processing system.

The process of determining the estimated displacement and/or velocity values can include any number of operations for weighting, prioritizing, and/or combining the GNSS data and the seismic sensor data. Merely by way of example, one technique for combining the GNSS displacement value with the seismic displacement values is through the use of a Kalman filter, taking into account the sample frequency of each input and the error characteristic(s) of each input. Generally, the system can employ a Kalman filter to combine a series of measurements (i.e., GNSS data and seismic sensor data) observed over time. These data can include noise (random variations) and well as other systemic error or imprecision (described herein as error characteristics), and the Kalman filter can generate estimates of unknowns (such as the actual displacement and/or velocity during a given sample period) that generally have better accuracy and/or precision than the direct measurements themselves. In other words, the Kalman filter can recursively combine streams of noisy input data to produce a statistically optimal estimate of the underlying system state (which, in this case, is the estimated displacement and/or velocity during a given sample period). The filter works as a two-step, recursive process, in which a model is created, and predictions are made using the model. Further observations are used to update the model, which then can be used to make more precise predictions.

More specifically, FIG. 3 illustrates a method 300 of combining such data using a Kalman filter. As an initial step, at block 305, the method 300 includes weighting the GNSS data relative to the seismic sensor data, based at least in part on measured variances the GNSS position data over the sample period. For example, for relatively large measured variances, the GNSS solution might be expect to be more precise than the seismic sensor measurements, because the sensors might be subject to clipping or other error sources. As such, in these conditions, the GNSS data might be weighted more heavily. Conversely, for small variances in GNSS position, the inherent precision of the seismic sensor data would tend to indicate that that data would be more precise and should be weighted relatively more heavily The method 300 then includes estimating parameters of a model equation for predicting the estimated displacement value and/or the estimated velocity value (block 310). These estimations can be informed by the weighting decision made at block 310 and can further account for the relative sample frequencies and error characteristics of the GNSS receiver and the seismic sensor. The model equation itself can be based on a presupposed order of the function describing the system state. For example, a system in a relatively constant state would have a descriptive function of order 0, while a dynamic state could correspond to a linear function (order 1); a highly dynamic system might correspond to a quadratic function (order 2). Generally, a linear function can be used as the model for the displacement estimate, but other functions are possible as well. The system thus estimates parameters for a linear (or other function) that would best fit the weighted measurements of displacement (and/or velocity) at times $t_{n-1}$ and $t_n$, for example.

As the second step of the Kalman filter, the method 300 includes predicting a system state based on the estimated parameters (block 315). For example, the method might predict a displacement at time $t_{n+1}$ based on the equation and the estimated parameters. The method then runs recursively, where measurements at time $t_{n+1}$ then can weighted (at block 305) be used to update the equation parameters (block 310) to fit the prediction more closely to the observed system state. This process can be repeated recursively in real time to continually produce estimates of system state (e.g., displacement values and/or velocity values) that are optimum combinations of the GNSS data and the seismic sensor data (block 320), accounting for random noise, systemic imprecision, and/or drift of seismic sensor data.

Various embodiments can employ the Kalman filter in different ways. In an EEW system, the method might comprise running the Kalman filter in a forward filtering operation, as described above, to minimize latency in generating warning data. In other cases, where minimizing latency might be of less concern, the filter can be run in reverse (backward filtering); effectively, the filter can be run with the time series in reverse, to "predict" past system states and, by comparing the predicted state with the actual state that that time; this can provide further refinement of the prediction model. Similarly, the Kalman filter can be run in a forward-backward smoothing operation to still further refine the model equation and improve the precision of its estimates. Certain of these embodiments can produce estimated displacement values with resolutions between on micrometer and 300 mm and frequencies greater than 80 Hz, which can provide better performance than either the GNSS data or the seismic sensor data taken alone.

Returning to FIG. 2, the method 200 can further comprise transmitting the estimated displacement value and/or the estimated velocity value (e.g., with an I/O interface of a displacement measurement device). In one embodiment, a rapid event notification technique can be used transmit these data (and any other data that is transmitted as described below). For example, the Model 130S series of Seismic Recorders, available from REF TEK, a division of Trimble Navigation Ltd. provides rapid event notification capabilities that allow output digital data every 200 ms. This is a significant reduction in the time delay required for real-time transmission using conventional digitizers. A daemon on a server in communication with the device receives the digital data from the device and acknowledges data received without error. The daemon forwards all received data in real-time to interested parties (governmental agencies, etc.) and or to clients for further processing. The device can track which data has not been acknowledged by the daemon and can re-transmit the data, while giving priority to current data using a backfilling algorithm to re-transmit during quiet periods when current data is not available to be transmitted. When a re-transmitted packet is acknowledged by daemon, the packet is then stored in an archive by the daemon in time and sequence order. The clients receive real-time data. This system can acquire data in 200 ms packets, with a time to construct each packet of less than 50 ms, and the data can be transmitted within 400 ms to a server over an Ethernet connection. This can allow earthquake notification to be transmitted ahead of seismic energy affecting a populated area.

In some cases, the method can include calculating a predominant period ($\tau_c$) of an earthquake or other displacement event (block 255), which can usually be estimated at about 3.0 s for earthquakes of moment magnitude ($M_w$) of about 6.5 or less. Kanamori, *Real-Time Seismology and Earthquake Damage Mitigation* (Annu. Rev. Earth Planet. Sci. 2005.33:195-214) describes exemplary techniques to calculate these values, although other techniques are known as well. The method 200 can further comprise calculating a peak displacement during the predominant period (block 260), which can comprise determining the largest estimated displacement during this predominant period, based on the determined estimated displacements measured during the predominant period. From the predominant period (which might be given as 3.0 s or calculated in real time) and the peak displacement during that period, the method 200 can comprise determining an intensity level of the earthquake (or other displacement event). In one aspect, the intensity level can be categorized as level 0 (no damage likely), level I (damage likely distant from the measurement location), level II (damage likely local to the measurement location), or level III (widespread damage likely). In other embodiments, different intensity scales can be used, such as the Modified Mercalli Index ("MMI").

At block 270, the method 200 can include providing an early warning of an earthquake (or other displacement event). In some cases, the rapid event notification technique described above can be used to transmit such a warning from an I/O interface of the measurement device to a central server, from which it can be distributed to governmental agencies or other authorities. The information conveyed in the warning can include a variety of data, depending on the purpose of the warning. For example, the warning might include only the intensity level of the detected event. In other cases, the predominant period and/or peak displacement values can be included in the warning. In further cases, the estimated displacement and or velocity can be included as well (in which case a single transmission might include the estimated data and the warning itself).

Figure 4:
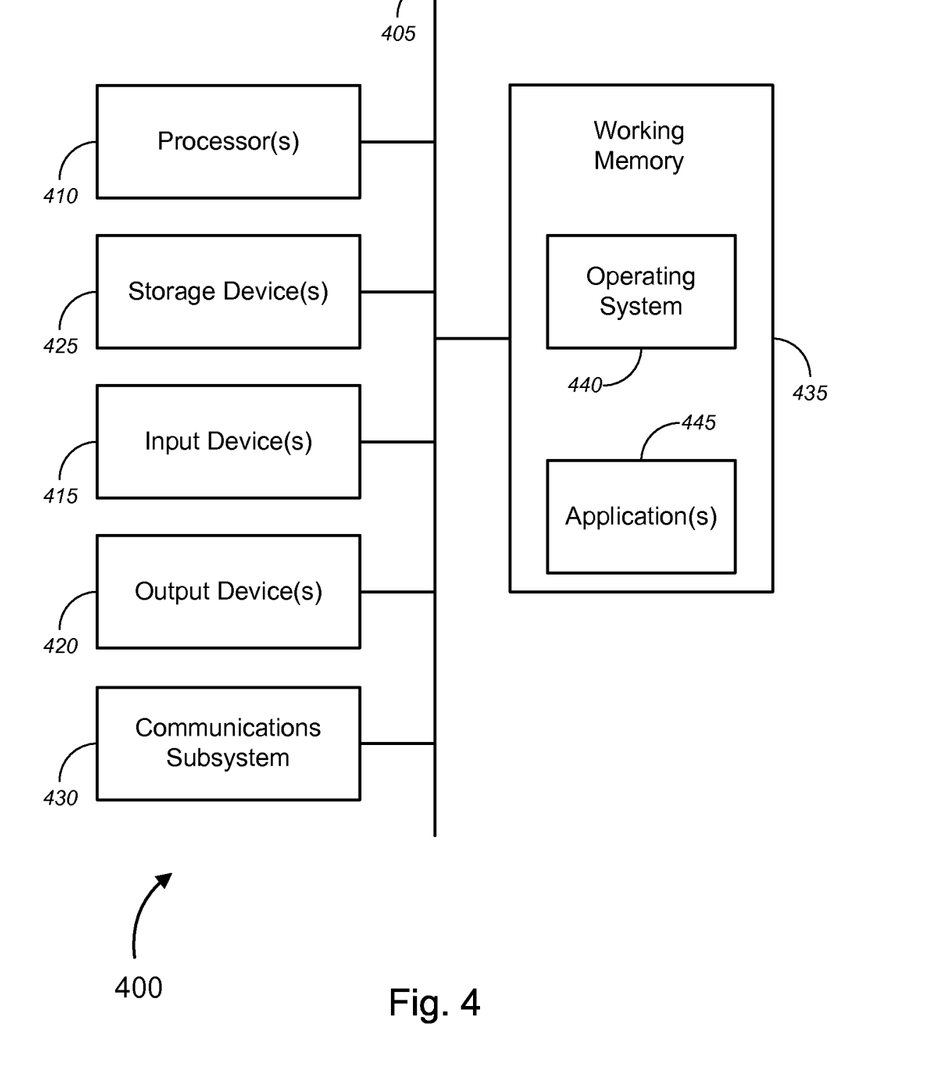
FIG. 4 is a generalized schematic diagram illustrating a computer system, in accordance with various embodiments.
Figure 5:
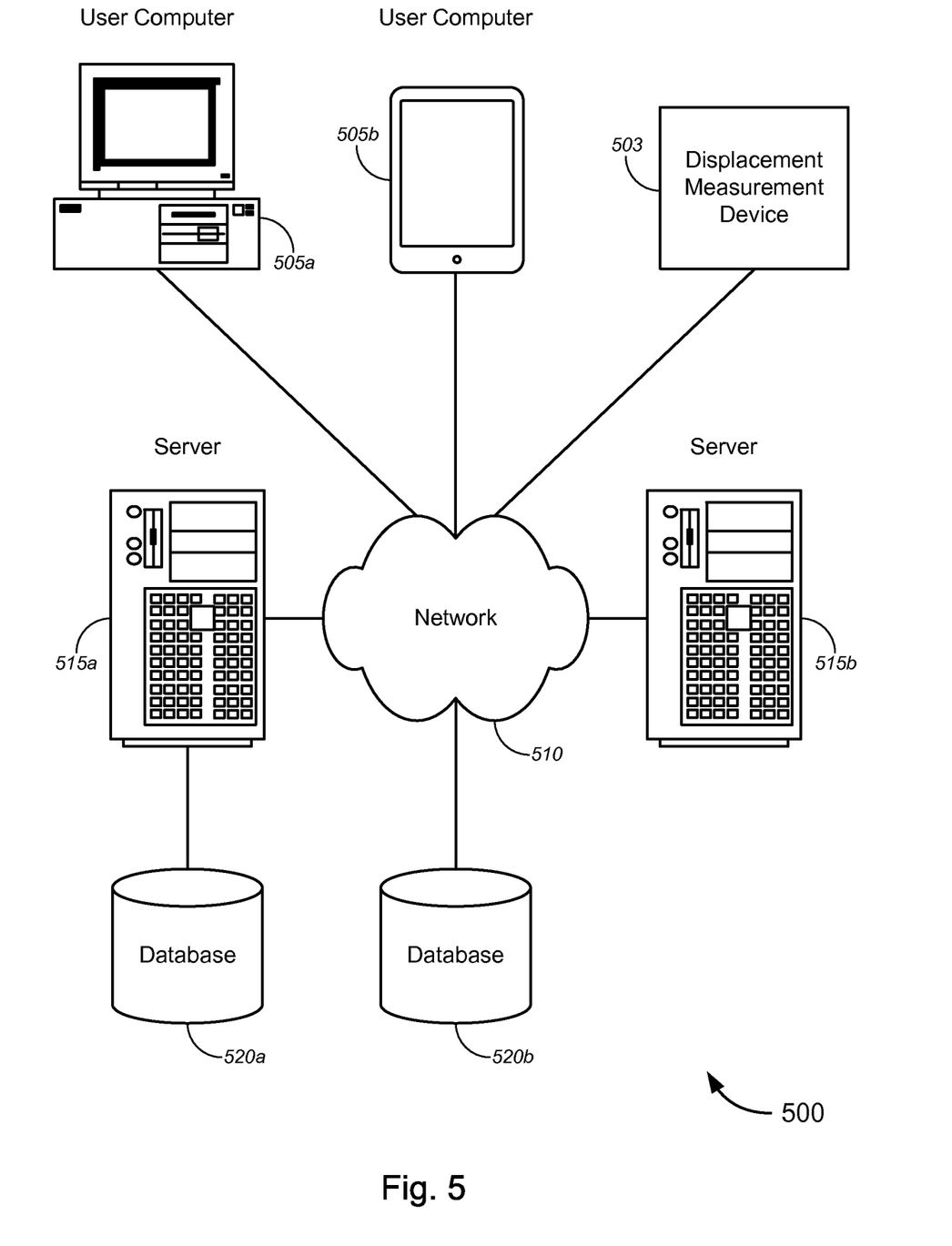
FIG. 5 is a block diagram illustrating a networked system of computers, which can be used in accordance with various embodiments.

FIG. 4 provides a schematic illustration of one embodiment of a computer system 400 that can perform the methods provided by various other embodiments, as described herein, and/or can function as processing system for a displacement measurement device and/or various components of the system 500 of FIG. 5 described below. It should be noted that FIG. 4 is meant only to provide a generalized illustration of various components, of which one or more (or none) of each may be utilized as appropriate. FIG. 4, therefore, broadly illustrates how individual system elements may be implemented in a relatively separated or relatively more integrated manner.

The computer system 400 is shown comprising hardware elements that can be electrically coupled via a bus 405 (or may otherwise be in communication, as appropriate). The hardware elements may include one or more processors 410, including without limitation one or more general-purpose processors and/or one or more special-purpose processors (such as digital signal processing chips, graphics acceleration processors, and/or the like); one or more input devices 415, which can include without limitation a mouse, a keyboard and/or the like; and one or more output devices 420, which can include without limitation a display device, a printer and/or the like.

The computer system 400 may further include (and/or be in communication with) one or more storage devices 425, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 400 might also include a communications subsystem 430, which can include without limitation a modem, a network card (wireless or wired), a satellite receiver (e.g., a GNSS receiver), an infra-red communication device, a wireless communication device and/or chipset (such as a Bluetooth™ device, an 802.11 device, a WiFi device, a WiMax device, a WWAN device, cellular communication facilities, etc.), and/or the like. The communications subsystem 430 may permit data to be exchanged with a network (such as the network described below, to name one example), with other computer systems, and/or with any other devices described herein. In many embodiments, the computer system 400 will further comprise a working memory 435, which can include a RAM or ROM device, as described above.

The computer system 400 also may comprise software elements, shown as being currently located within the working memory 435, including an operating system 440, device drivers, executable libraries, and/or other code, such as one or more application programs 445, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be encoded and/or stored on a non-transitory computer readable storage medium, such as the storage device(s) 425 described above. In some cases, the storage medium might be incorporated within a computer system, such as the system 400. In other embodiments, the storage medium might be separate from a computer system (i.e., a removable medium, such as a compact disc, etc.), and/or provided in an installation package, such that the storage medium can be used to program, configure and/or adapt a general purpose computer with the instructions/code stored thereon. These instructions might take the form of executable code, which is executable by the computer system 400 and/or might take the form of source and/or installable code, which, upon compilation and/or installation on the computer system 400 (e.g., using any of a variety of generally available compilers, installation programs, compression/decompression utilities, etc.) then takes the form of executable code.

It will be apparent to those skilled in the art that substantial variations may be made in accordance with specific requirements. For example, customized hardware (such as programmable logic controllers, field-programmable gate arrays, application-specific integrated circuits, and/or the like) might also be used, and/or particular elements might be implemented in hardware, software (including portable software, such as applets, etc.), or both. Further, connection to other computing devices such as network I/O devices may be employed.

As mentioned above, in one aspect, some embodiments may employ a computer system (such as the computer system 400) to perform methods in accordance with various embodiments of the invention. According to a set of embodiments, some or all of the procedures of such methods are performed by the computer system 400 in response to processor 410 executing one or more sequences of one or more instructions (which might be incorporated into the operating system 440 and/or other code, such as an application program 445) contained in the working memory 435. Such instructions may be read into the working memory 435 from another computer readable medium, such as one or more of the storage device(s) 425. Merely by way of example, execution of the sequences of instructions contained in the working memory 435 might cause the processor(s) 410 to perform one or more procedures of the methods described herein.

The terms "machine readable medium" and "computer readable medium," as used herein, refer to any medium that participates in providing data that causes a machine to operation in a specific fashion. In an embodiment implemented using the computer system 400, various computer readable media might be involved in providing instructions/code to processor(s) 410 for execution and/or might be used to store and/or carry such instructions/code (e.g., as signals). In many implementations, a computer readable medium is a non-transitory, physical and/or tangible storage medium. Such a medium may take many forms, including but not limited to, non-volatile media, volatile media, and transmission media. Non-volatile media includes, for example, optical and/or magnetic disks, such as the storage device(s) 425. Volatile media includes, without limitation, dynamic memory, such as the working memory 435. Transmission media includes, without limitation, coaxial cables, copper wire and fiber optics, including the wires that comprise the bus 405, as well as the various components of the communication subsystem 430 (and/or the media by which the communications subsystem 430 provides communication with other devices). Hence, transmission media can also take the form of waves (including without limitation radio, acoustic and/or light waves, such as those generated during radio-wave and infra-red data communications).

Common forms of physical and/or tangible computer readable media include, for example, a floppy disk, a flexible disk, a hard disk, magnetic tape, or any other magnetic medium, a CD-ROM, any other optical medium, a RAM, a PROM, and EPROM, a FLASH-EPROM, any other memory chip or cartridge, a carrier wave as described hereinafter, or any other medium from which a computer can read instructions and/or code.

Various forms of computer readable media may be involved in carrying one or more sequences of one or more instructions to the processor(s) 410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 400. These signals, which might be in the form of electromagnetic signals, acoustic signals, optical signals and/or the like, are all examples of carrier waves on which instructions can be encoded, in accordance with various embodiments of the invention.

The communications subsystem 430 (and/or components thereof) generally will receive the signals, and the bus 405 then might carry the signals (and/or the data, instructions, etc. carried by the signals) to the working memory 435, from which the processor(s) 405 retrieves and executes the instructions. The instructions received by the working memory 435 may optionally be stored on a storage device 425 either before or after execution by the processor(s) 410.

As noted above, a set of embodiments comprises systems for detecting earthquakes and other displacement, such as structural displacement. FIG. 5 illustrates a schematic diagram of a system 500 that can be used in accordance with one set of embodiments. In an aspect, the system 500 can include one or more displacement measurement devices 503. FIG. 1 illustrates an example of one such device. In another aspect, the system 500 (and various components thereof, such as the user computers and/or servers 515 described below) can be used to distribute data and/or warnings from such devices 503, to provide GNSS corrections to such devices 503, to perform processing operations described above with regard to FIGS. 2 and/or 3, and/or to perform post-processing of data collected by such devices 503.

The system 500 can include one or more user computers 505. A user computer 505 can be a general purpose personal computer (including, merely by way of example, desktop computers, tablet computers, laptop computers, handheld computers, and the like, running any appropriate operating system, several of which are available from vendors such as Apple, Microsoft Corp., and the like) and/or a workstation computer running any of a variety of commercially-available UNIX™ or UNIX-like operating systems. A user computer 505 can also have any of a variety of applications, including one or more applications configured to perform methods provided by various embodiments (as described above, for example), as well as one or more office applications, database client and/or server applications, and/or web browser applications. Alternatively, a user computer 505 can be any other electronic device, such as a thin-client computer, Internet-enabled mobile telephone, and/or personal digital assistant, capable of communicating via a network (e.g., the network 510 described below) and/or of displaying and navigating web pages or other types of electronic documents. Although the exemplary system 500 is shown with three user computers 505, any number of user computers can be supported.

Certain embodiments operate in a networked environment, which can include a network 510. The network 510 can be any type of network familiar to those skilled in the art that can support data communications using any of a variety of commercially-available (and/or free or proprietary) protocols, including without limitation TCP/IP, SNA™, IPX™, AppleTalk™, and the like. Merely by way of example, the network 510 can include a local area network ("LAN"), including without limitation a fiber network, an Ethernet network, a Token-Ring™ network and/or the like; a wide-area network; a cellular or other wireless wide area network ("WWAN"); a virtual network, such as a virtual private network ("VPN"); the Internet; an intranet; an extranet; a public switched telephone network ("PSTN"); an infra-red network; a wireless network, including without limitation a network operating under any of the IEEE 802.11 suite of protocols, the Bluetooth™ protocol known in the art, and/or any other wireless protocol; and/or any combination of these and/or other networks.

Embodiments can also include one or more server computers 515. Each of the server computers 515 may be configured with an operating system, including without limitation any of those discussed above, as well as any commercially (or freely) available server operating systems. Each of the servers 515 may also be running one or more applications, which can be configured to provide services to one or more clients 505 and/or other servers 515. In some cases, a server 515 can perform some or all of the processing tasks described with respect to the processing system 130 of FIG. 1 and/or operations in accordance with the methods of FIGS. 2 and/or 3; in other cases, the servers 515 can be used to store, distribute (e.g., to user computers 505, governmental authorities, etc.), and/or provide access to data, warnings, and/or the like received from such a processing system. One or more servers 515 can also be used to provide an interface (e.g., a web interface) to provide configuration and control access to one or more of the detection devices 503.

Merely by way of example, one of the servers 515 may be a web server, which can be used, merely by way of example, to process requests for web pages or other electronic documents from user computers 505. The web server can also run a variety of server applications, including HTTP servers, FTP servers, CGI servers, database servers, Java servers, and the like. In some embodiments of the invention, the web server may be configured to serve web pages that can be operated within a web browser on one or more of the user computers 505 to perform methods of various embodiments.

The server computers 515, in some embodiments, might include one or more application servers, which can be configured with one or more applications accessible by a client running on one or more of the client computers 505 and/or other servers 515. Merely by way of example, the server(s) 515 can be one or more general purpose computers capable of executing programs or scripts in response to the user computers 505 and/or other servers 515, including without limitation web applications (which might, in some cases, be configured to perform methods provided by various embodiments). Merely by way of example, a web application can be implemented as one or more scripts or programs written in any suitable programming language, such as Java™, C, C #™ or C++, and/or any scripting language, such as Perl, Python, or TCL, as well as combinations of any programming and/or scripting languages. The application server(s) can also include database servers, including without limitation those commercially available from Oracle™, Microsoft™, Sybase™, IBM™ and the like, which can process requests from clients (including, depending on the configuration, dedicated database clients, API clients, web browsers, etc.) running on a user computer 505 and/or another server 515. In some embodiments, an application server can create web pages dynamically for displaying the information in accordance with various embodiments, such as displacement and velocity estimates from detection devices 503, warnings generated (by a server 515, by a detection device 503, etc.) based on such data, configuration interfaces for such devices 503, etc. Data provided by an application server may be formatted as one or more web pages (comprising HTML, JavaScript, etc., for example) and/or may be forwarded to a user computer 505 via a web server (as described above, for example). Similarly, a web server might receive web page requests and/or input data from a user computer 505 and/or forward the web page requests and/or input data to an application server. In some cases a web server may be integrated with an application server.

In accordance with further embodiments, one or more servers 515 can function as a file server and/or can include one or more of the files (e.g., application code, data files, etc.) necessary to implement various disclosed methods, incorporated by an application running on a user computer 505 and/or another server 515. Alternatively, as those skilled in the art will appreciate, a file server can include all necessary files, allowing such an application to be invoked remotely by a user computer 505 and/or server 515.

It should be noted that the functions described with respect to various servers herein (e.g., application server, database server, web server, file server, etc.) can be performed by a single server and/or a plurality of specialized servers, depending on implementation-specific needs and parameters.

In certain embodiments, the system can include one or more databases 520. The location of the database(s) 520 is discretionary: merely by way of example, a database 520a might reside on a storage medium local to (and/or resident in) a server 515a (and/or a user computer 505). Alternatively, a database 520b can be remote from any or all of the computers 505, 515, so long as it can be in communication (e.g., via the network 510) with one or more of these. In a particular set of embodiments, a database 520 can reside in a storage-area network ("SAN") familiar to those skilled in the art. (Likewise, any necessary files for performing the functions attributed to the computers 505, 515 can be stored locally on the respective computer and/or remotely, as appropriate.) In one set of embodiments, the database 520 can be a relational database, such as an Oracle database, that is adapted to store, update, and retrieve data in response to SQL-formatted commands. The database might be controlled and/or maintained by a database server, as described above, for example.

While certain features and aspects have been described with respect to exemplary embodiments, one skilled in the art will recognize that numerous modifications are possible. For example, the methods and processes described herein may be implemented using hardware components, software components, and/or any combination thereof. Further, while various methods and processes described herein may be described with respect to particular structural and/or functional components for ease of description, methods provided by various embodiments are not limited to any particular structural and/or functional architecture but instead can be implemented on any suitable hardware, firmware and/or software configuration. Similarly, while certain functionality is ascribed to certain system components, unless the context dictates otherwise, this functionality can be distributed among various other system components in accordance with the several embodiments.

Moreover, while the procedures of the methods and processes described herein are described in a particular order for ease of description, unless the context dictates otherwise, various procedures may be reordered, added, and/or omitted in accordance with various embodiments. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments are described with—or without—certain features for ease of description and to illustrate exemplary aspects of those embodiments, the various components and/or features described herein with respect to a particular embodiment can be substituted, added and/or subtracted from among other described embodiments, unless the context dictates otherwise. Consequently, although several exemplary embodiments are described above, it will be appreciated that the invention is intended to cover all modifications and equivalents within the scope of the following claims.

What is claimed is:

1. An earthquake early warning system, comprising:
    a housing;
    a global navigation satellite system (GNSS) receiver disposed within the housing;
    one or more seismic sensors disposed within the housing, the one or more seismic sensors coupled to one of a ground surface, structure, or object;
    an input/output interface;
    a processor disposed within the housing; and
    a computer readable medium disposed within the housing, the computer readable medium having encoded thereon a set of instructions executable by the processor, the set of instructions comprising:
        instructions to receive GNSS position data with the GNSS receiver, the GNSS receiver having a GNSS operating characteristic and a GNSS error characteristic;
        instructions to receive GNSS correction data over a network connection or from a GNSS satellite;
        instructions to correct the GNSS position data using the GNSS correction data;
        instructions to observe seismic data with the one or more seismic sensors, the one or more seismic sensors each having a seismic operating characteristic and a seismic error characteristic;
        instructions to integrate the seismic data to calculate a seismic sensor displacement value over a specified sample period;
        instructions to calculate a GNSS displacement value from the GNSS position data gathered over the specified sample period;
        instructions to combine the GNSS displacement value with the seismic sensor displacement value in a Kalman filter, based at least in part on the GNSS operating characteristic and error characteristic and the seismic operating characteristic and error characteristic, wherein combining the GNSS displacement and the seismic sensor displacement value comprises performing at least a forward filtering operation with the Kalman filter, wherein the instructions to combine the GNSS displacement value with the seismic sensor displacement value in the Kalman filter further includes:
            instructions to estimate parameters of a model equation for predicting the estimated displacement value and the estimated velocity value, based on an order of a function of the model equation, the GNSS data, GNSS operating characteristic, GNSS error characteristic, seismic data, seismic operating characteristic, and seismic error characteristic, and instructions to update the estimated parameters based on weighted measurements of the GNSS data and seismic data;
            instructions to determine, in real time, an estimated displacement value and an estimated velocity value from the combined GNSS and seismic sensor displacement values;
        instructions to calculate, in real time, a predominant period, wherein the predominant period includes at least two estimated displacements;
        instructions to calculate, in real time, a peak displacement during the predominant period;
        instructions to determine an intensity level of an earthquake based at least in part on one or more of the predominant period and the peak displacement; and
        instructions to transmit an earthquake warning indicating the determined intensity level using the input/output interface.

2. A displacement measurement device, comprising:
    a housing;
    a global navigation satellite system (GNSS) receiver disposed within the housing;
    one or more seismic sensors disposed within the housing, the one or more seismic sensors coupled to one of a ground surface, structure, or object;
    an input/output interface;
    a processor disposed within the housing; and a computer readable medium disposed within the housing, the computer readable medium having encoded thereon a set of instructions executable by the processor, the set of instructions comprising:

instructions to receive GNSS position data with the GNSS receiver, the GNSS sensor having a GNSS operating characteristic and a GNSS error characteristic;

instructions to observe seismic data with the one or more seismic sensors, the one or more seismic sensors each having a seismic operating characteristic and a seismic error characteristic;

instructions to integrate the seismic data to calculate a seismic sensor displacement value over a specified sample period;

instructions to calculate a GNSS displacement value from the GNSS position data gathered over the specified sample period;

instructions to combine the GNSS displacement value with the seismic sensor displacement value in a Kalman filter, based at least in part on the GNSS operating characteristic and error characteristic and the seismic operating characteristic and error characteristic wherein the instructions to combine the GNSS displacement value with the seismic sensor displacement value in the Kalman filter further includes:

instructions to estimate parameters of a model equation for predicting the estimated displacement value and the estimated velocity value, based on an order of a function of the model equation, the GNSS data, GNSS operating characteristic, GNSS error characteristic, seismic data, seismic operating characteristic, and seismic error characteristic, and instructions to update the estimated parameters based on weighted measurements of the GNSS data and seismic data;

instructions to determine, in real time, at least one of an estimated displacement value or an estimated velocity value from the combined GNSS and seismic sensor displacement value; and instructions to transmit the at least one of the estimated displacement value or the estimated velocity value using the input/output interface.

3. The displacement measurement device of claim 2, wherein the set of instructions further comprises:
instructions to calculate, in real time, a predominant period, wherein the predominant period includes at least two estimated displacements.

4. The displacement measurement device of claim 3, wherein the set of instructions further comprises:
instructions to calculate, in real time, a peak displacement during the predominant period.

5. The displacement measurement device of claim 4, wherein the set of instructions further comprises:
instructions to determine an intensity level of an earthquake based at least in part on one or more of the predominant period and the peak displacement.

6. The displacement measurement device of claim 5, wherein the computer readable medium further comprises instructions to provide warning of the earthquake, based, in part, on at least one of the estimated displacement value, the estimated velocity value, peak displacement during predominant period, or the estimated intensity level of the earthquake.

7. The displacement measurement device of claim 5, wherein the computer readable medium further comprises instructions to provide warning of instability of the structure, based, in part, on at least one of the estimated displacement value, the estimated velocity value, peak displacement during the predominant period, or the estimated intensity level of the earthquake.

8. The displacement measurement device of claim 5, wherein the computer readable medium further comprises instructions to provide warning of theft of the object, based, in part, on at least one of the estimated displacement value, the estimated velocity value, or peak displacement during the predominant period.

9. The displacement measurement device of claim 2, wherein the one or more seismic sensors comprise a seismometer.

10. The displacement measurement device of claim 2, wherein the one or more seismic sensors comprise an accelerometer.

11. The displacement measurement device of claim 2, wherein the one or more seismic sensors comprise a seismometer and an accelerometer.

12. The displacement measurement device of claim 2, wherein the GNSS receiver comprises a GNSS sensor that receives GNSS data directly from one or more GNSS satellites.

13. The displacement measurement device of claim 2, wherein the GNSS receiver receives real-time GNSS correction data over a network connection through the input/output interface, and wherein the GNSS data is corrected using the GNSS correction data.

14. The displacement measurement device of claim 2, wherein the GNSS receiver receives real-time GNSS correction data over a satellite connection with one or more GNSS satellites, and wherein the GNSS data is corrected using the GNSS correction data.

15. The displacement measurement device of claim 2, wherein the instructions to combine the GNSS displacement value with the seismic sensor displacement value comprise instructions to predict a system state based on the estimated parameters of the model.

16. The displacement measurement device of claim 2, wherein the instructions to combine the GNSS displacement value with the seismic sensor displacement value further comprise instructions to weight the GNSS data relative to the seismic sensor data based at least in part on measured variances in the GNSS position data over the sample period.

17. The displacement measurement device of claim 2, wherein the instructions to combine the GNSS displacement value with the seismic sensor displacement value comprise instructions to perform one or more operations from the group consisting of:
forward Kalman filtering;
backward Kalman filtering; and
a smoothing operation with a forward-backward filter.

18. The displacement measurement device of claim 2, wherein the instructions to determine, in real time, at least one of an estimated displacement value or an estimated velocity value comprise instructions to determine the at least one of the estimated displacement value or the estimated velocity value with a latency of less than one second from an end of the sample period.

19. The displacement measurement device of claim 2, wherein the instructions to determine, in real time, at least one of an estimated displacement value or an estimated velocity value comprise instructions to determine the at least one of the estimated displacement value or the estimated velocity value with a latency of less than thirty milliseconds from an end of the sample period.

20. The displacement measurement device of claim 2, wherein the instructions to determine, in real time, at least one of an estimated displacement value or an estimated velocity value comprise instructions to determine the at least one of the estimated displacement value or the estimated velocity value with a latency of less than two hundred milliseconds from an end of the sample period.

21. The displacement measurement device of claim 2, wherein the estimated displacement value has a resolution between one micrometer and 0.3 meters.

22. The displacement measurement device of claim 2, wherein the instructions to transmit the at least one of the estimated displacement value or the estimated velocity value comprise instructions to transmit using a rapid event notification technique.

23. A method, comprising:
    placing, at a measurement location, a displacement measurement device, wherein the measurement location includes one of a ground surface, structure, or object, and wherein the displacement measurement device comprises:
        a housing;
        a global navigation satellite system (GNSS) data receiver disposed within the housing;
        one or more seismic sensors disposed within the housing;
        an input/output interface; and
        a processor disposed within the housing; and
    receiving, with the GNSS receiver, GNSS position data, the GNSS receiver having a GNSS operating characteristic and a GNSS error characteristic;
    observing, with the one or more seismic sensors, seismic data, the one or more seismic sensors each having a seismic operating characteristic and a seismic error characteristic;
    integrating the seismic data to calculate a seismic sensor displacement value over a specified sample period;
    calculating a GNSS displacement value from the GNSS position data gathered over the specified sample period;
    combining the GNSS displacement value with the seismic sensor displacement value in a Kalman filter, based at least in part on the GNSS operating characteristic and error characteristic and the seismic sample operating characteristic and error characteristic, wherein combining the GNSS displacement value with the seismic sensor displacement value in the Kalman filter further includes:
        estimating parameters of a model equation for predicting the estimated displacement value and the estimated velocity value, based on an order of a function of the model equation, the GNSS data, GNSS operating characteristic, GNSS error characteristic, seismic data, seismic operating characteristic, and seismic error characteristic, and
        updating the estimated parameters based on weighted measurements of the GNSS data and seismic data;
    determining, in real time, at least one of an estimated displacement value or an estimated velocity value from the combined GNSS and seismic sensor displacement value; and
    transmitting the at least one of the estimated displacement value or the estimated velocity value using the input/output interface.

* * * * *